No. 803,322. PATENTED OCT. 31, 1905.
D. BACON.
MOTOR ACTUATOR.
APPLICATION FILED FEB. 25, 1905.
2 SHEETS—SHEET 1.
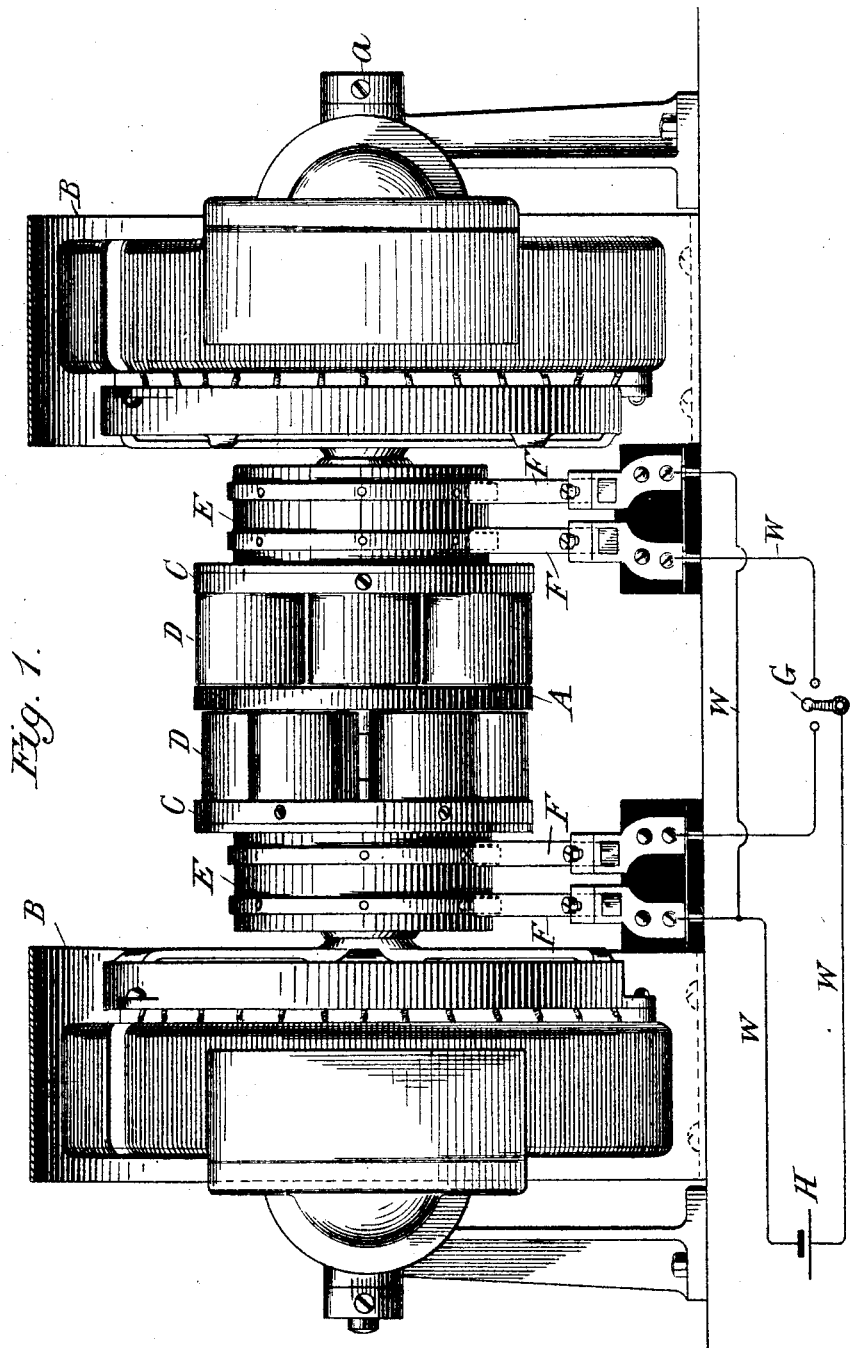

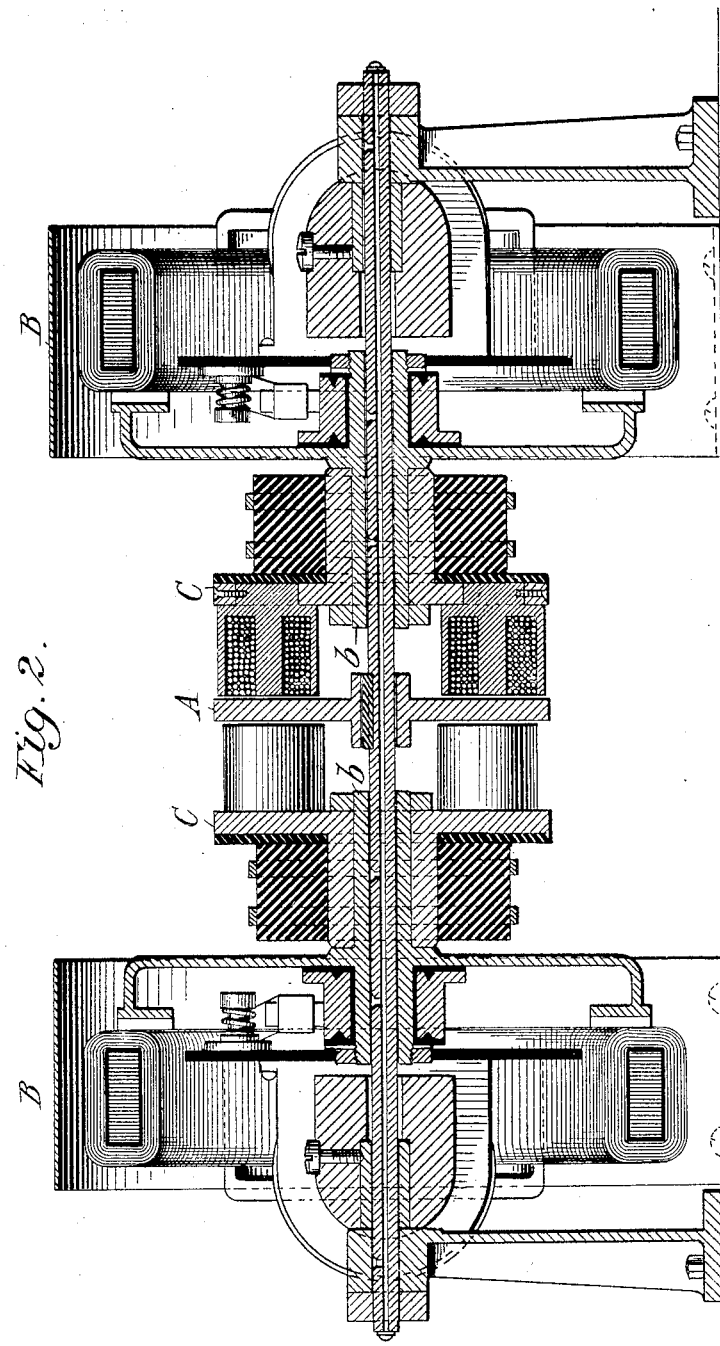

UNITED STATES PATENT OFFICE.

DANIEL BACON, OF NEW YORK, N. Y.

MOTOR-ACTUATOR.

No. 803,322.     Specification of Letters Patent.     Patented Oct. 31, 1905.

Application filed February 25, 1905. Serial No. 247,216.

*To all whom it may concern:*

Be it known that I, DANIEL BACON, a citizen of the United States, and a resident of Brooklyn borough, New York city, State of New York, have invented certain new and useful Improvements in Motor-Actuators, of which the following is a specification.

The object of my invention is to provide mechanism by which an electric motor can be actuated with greater speed and delicacy than has heretofore been possible and entirely without toothed gear, so that the apparatus driven by said motor, whether a trolley-car, marine or other engine, propeller-shaft, or any other form of mechanism, may at all times be under perfect control and if occasion requires rapidly reversed or stopped without danger to the machinery.

One form of my invention is shown in the accompanying drawings, in which—

Figure 1 is a side elevation. Fig. 2 is a vertical section.

Same letters indicate similar parts in the different drawings.

The essential features of this invention consist in mounting all the motor devices except the driving-armatures loosely, so that they may be in constant rotation and always ready to pick up the driving-armatures, which are keyed to the shaft to be driven. It is largely a matter of convenience and mechanical construction whether one or more driving-armatures are employed and whether they are between or outside of the revolving motor devices; but in the drawings I have shown for simplicity a single driving-armature A, situated between the motors and splined to the driving-shaft $a$, from which motion is communicated to the driven mechanism. (Not shown.)

B B are two electric motors connected by wires (not shown) to any suitable source of electrical energy, and they are mounted upon sleeves $b\ b$, which are loose on the shaft $a$, the design being that both of said motors shall be in constant rotation freely around said shaft and in opposite directions. Mounted on said sleeves are the magnet-disks C C, which carry a convenient number of magnets D D, which are sufficiently near the armature A to pick it up when said magnets are energized. It will be understood that only one set of magnets D picks up the armature at a time and that in so picking it up the weight and momentum of the revolving motor are utilized as a flywheel as an initial force to overcome the inertia of the armature and shaft. This is particularly useful when the armature and shaft have been revolving in a direction opposite to that of the motor by reason of their having been driven by the other motor.

E E are collector-rings mounted on the sleeves $b\ b$ and connected with the magnets in the usual manner and deriving their energy through the brushes F F and wires $w\ w$ from a battery H or other source of electrical power as determined by the switch G.

Whenever it is desired to rotate the armature by means of either set of magnets, the switch G is turned to make contact between the battery and the wires leading to said set of magnets, and therefore the operator can at all times determine the direction of revolution of the driving-shaft $a$ by simply turning the switch, so as to energize the corresponding magnets, the other magnets running idle meanwhile in the opposite direction. It will be readily understood, therefore, that as the selection as to which of the revolving motors shall act effectively upon the driving-armature and shaft can be instantaneously put into effect by means of the switch and can be shifted as often as may be required the driving-shaft can be controlled with great accuracy and perfect safety in the transmission of motion in either direction.

I claim—

A motor-actuator which consists of a number of independent motors loosely mounted upon a shaft and adapted to be rotated constantly in opposite directions; a disk rigidly attached to and rotating with each motor and carrying a set of electromagnets; and an armature, mounted upon said shaft and adapted to be rotated by either of said motors as desired, said magnets being under the control of suitable mechanism whereby electric energy is shifted from one set of magnets to the other.

DANIEL BACON.

Witnesses:
ANNA H. VAN HORENBERG,
W. P. PREBLE, Jr.